April 23, 1963 W. R. FRAZIER 3,086,712

TILTED AXIS TWIN DISC PAINT SPRAYER

Filed Sept. 27, 1961 2 Sheets-Sheet 1

United States Patent Office 3,086,712
Patented Apr. 23, 1963

3,086,712
TILTED AXIS TWIN DISC PAINT SPRAYER

William R. Frazier, Canton, Ohio, assignor to The Hoover Company, North Canton, Ohio, a corporation of Ohio Filed Sept. 27, 1961, Ser. No. 141,065
2 Claims. (Cl. 239—15)

The present invention relates to electrostatic spray painting apparatus and more particularly to the dual rotating disc type of apparatus.

In the duel rotating disc type of electrostatic spray painting apparatus two rotating atomizer discs are spaced apart from each other and are rotated at high speed on a vertical axis.

The articles to be painted are mounted on a closed loop conveyor track which first travels past one of the discs, makes a loop and returns past the other disc, the articles usually being rotated as they move along the conveyor track.

The track and thus the articles being conveyed are grounded while the two rotating discs are charged at high potential.

Paint is delivered to the under surface of each of the rotating discs and is thrown from the periphery of the rotating discs by centrifugal action and thus atomized.

As the paint leaves the periphery of the discs it is in the form of finely divided particles or droplets which are electrostatically charged at high potential which repel each other and thus are distributed over a wide area about the periphery of the discs and are attracted to the grounded articles.

The paint particles which are thrown from the area between the two discs repel each other and thus are directed in a diverging spray pattern toward the grounded articles as they pass outside of the discs.

In order to form the diverging spray pattern it is necessary that the two discs be located at substantially the same vertical level.

In practice that is almost impossible to attain and one disc will be mounted slightly above the other, with the result that some of the paint from the higher disc will be deposited on the top of the lower disc in the form of partially dried paint particles.

Such particles will slowly build up in the form of a fuzz on top of the lower disc and eventually centrifugal force will cause the mass to be thrown from the disc with the result that it will be deposited upon the articles being painted in the form of patches or blobs of partially dried paint.

Needless to say, such articles must be removed from the conveyor, the paint removed and the articles repainted.

The present invention obviates the foregoing difficulty by mounting the two discs for rotation on axes which are inclined outwardly at their lower ends from each other. The result is that the peripheries of the discs which face each other are slanted downwardly so that any paint thrown from the periphery of one disc will be projected below the edge of the other disc and thus will not be deposited on the top of the other disc in the form of partially dried paint particles.

Other objects and advantages of the invention will become apparent as the description proceeds when taken in connection with the accompanying drawings in which.

Figure 1:
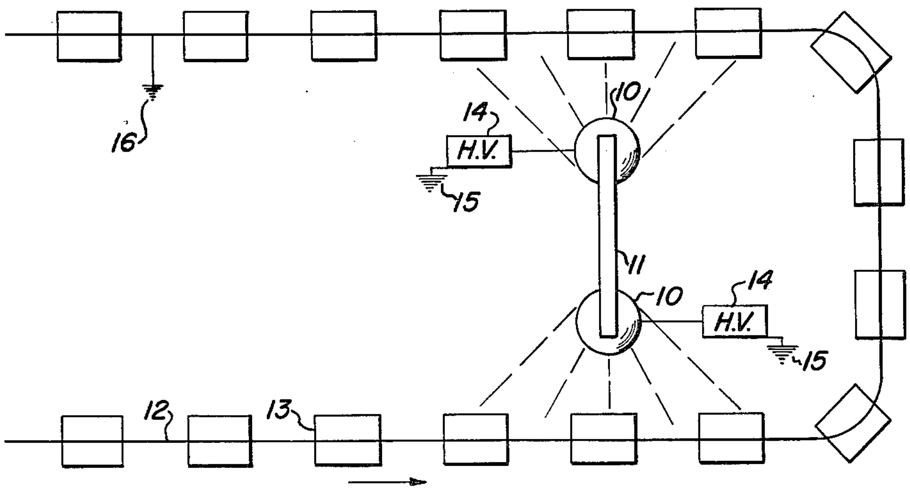
FIG. 1 is a schematic plan view showing the arrangement of the two rotating disc atomizers relative to the conveyer track and the articles being painted.

Referring to FIG. 1, the reference numeral 10 represents the two rotating disc atomizers which are shown mounted on a supporting bar 11.

The line 12 represents the track upon which the articles 13 are conveyed in a closed path about the rotating discs 10 in the direction of the arrow as shown.

The discs 10 are connected to a source of high potential 14 which is grounded at 15 in a manner well known in the art. The track 12 is grounded at 16, also a well known expedient.

The articles 13 are conveyed along the track 12 as shown and are usually rotated on a vertical axis as they pass by the rotating disc atomizers 10.

Figure 2:
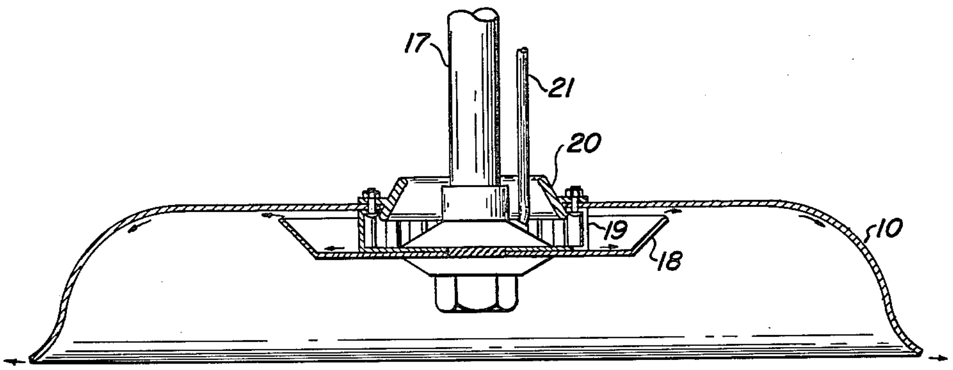
FIG. 2 is a view partly in section of one of the rotating discs, showing how the paint is delivered thereto.
Figure 3:
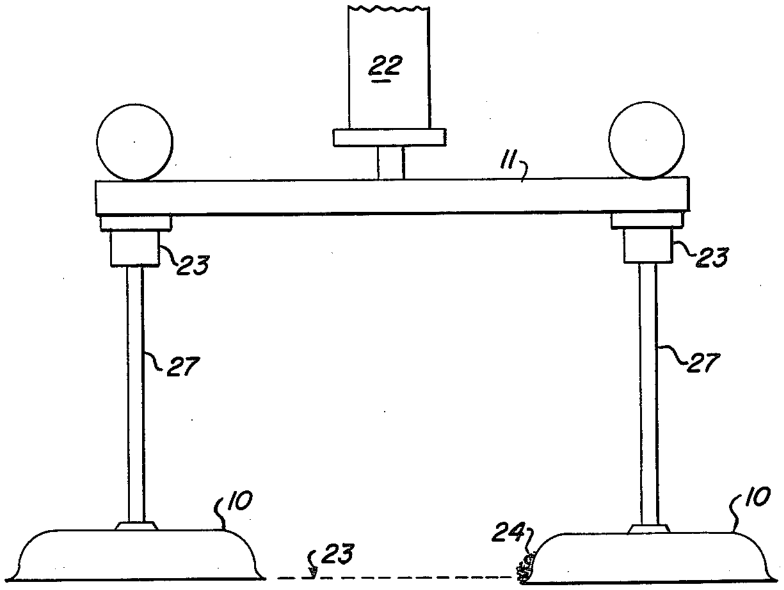
FIG. 3 is a view of the usual mounting arrangement for the two rotating discs showing how the paint collects on the lower of the two discs.

As shown in FIG. 2, each of the discs 10 is rotated by a shaft 17 which is rotated at a high speed by means of a motor as shown in FIG. 3. The lower end of shaft 17 is rigidly connected to a dish shaped paint distributer 18 which supports the disc 10 by means of an annular grid-like member 19 and an annular member 20 in such manner as to provide a central opening in each disc.

A stationary paint supply tube 21 is provided to deliver paint to the distributer from any suitable source.

FIG. 3 shows the usual manner of supportnig the discs 10. The supporting bar 11 is supported on the lower end of a column 22 which is reciprocated upwardly and downwardly as the discs 10 are rotated by air motors 23.

It is desirable that the discs be mounted at exactly the same level but in practice that is impossible with a result that one disc may be slightly above the other. In FIG. 3, the right hand disc 10 is shown slightly lower than the left hand disc.

In operation paint is delivered at a constant rate through tubes 21. As the discs 10 are rotated at high speed centrifugal action causes the paint to flow outwardly through the grid-like member 19 and onto the upper surface of the pan shaped distributer 18 as shown by the small arrows in FIG. 2.

From the peripheries of the distributers 18 the paint is thrown upwardly against the under surfaces of the discs 10 and moves outwardly along those surfaces and is forcibly thrown from the peripheries of the discs 10 and is atomized by centrifugal action. The small arrows of FIG. 2 show the path of movement of the paint.

The paint as it is discharged from the periphery of the discs 10 would normally form an annular pattern about the discs 10. The discs 10 are charged at high potential and the particles of paint leaving the discs 10 will also be charged at high potential.

As shown in FIG. 1 the two discs 10 are spaced apart adjacent to each other so that the paint particles between the two discs, being charged at the same potential, will repel each other. The articles 13 being at ground potential the paint particles will be attracted to them so that theoretically the combined action should form a fan-shaped spray as shown by the dash lines of FIG. 1.

However, in actual practice, and due to the centrifugal action caused by the high speed rotation of the discs 10, a few of the larger paint particles will travel from one disc toward the other as shown by the dotted line 23 of FIG. 3.

If one of the discs 10 should be lower than the other, as in FIG. 3, the larger paint particles will be deposited on the top surface of the lower disc, and being partially dried will collect in small masses of fuzzy paint as shown at 24 of FIG. 3.

The small masses 24 of paint will gradually grow larger in size until the centrifugal action of the rotating lower disc will throw them forcibly from the periphery of that disc and the partially dried paint will be deposited on the articles 13 in the form of patches or blobs of partially dried paint.

Obviously that is undesirable and requires that the articles be removed from the track, the paint removed and the defective articles repainted.

The normal mounting for the discs 10 is shown by FIG. 3. The shafts 17 and tubes 21, shown in FIG. 2, extend downwardly through supporting housings 27 rigidly attached to the casing of the motor 23 which is supported from the ends of the supporting bar 11.

Figure 4:
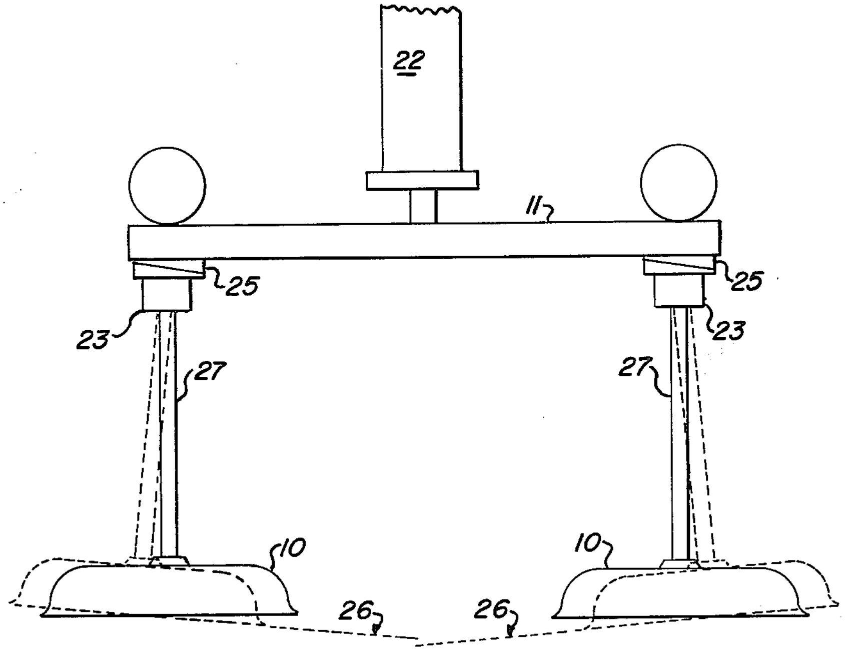
FIG. 4 is a view showing the mounting arrangement for the two discs according to the invention.

According to the present invention, as shown by FIG. 4, special supports 25 are provided so that the shafts 17 can be mounted at an angle of from 2 to 4° relative to each other as shown by the dotted lines of FIG. 4.

The supports 25 are in the form of superposed wedge shaped discs which may be rotated relative to each other to give the housings any inclination desired. It has been found that a 2° inclination is sufficient and that it may be increased to 4° if desired.

Thus any of the larger paint particles which may be projected from one disc toward the other will be projected below the edges of the respective discs as shown by the dotted lines 26 of FIG. 4.

While I have shown and described but a single embodiment of my invention, it is to be understood that that embodiment is to be taken as illustrative only and not in a limiting sense. I do not wish to be limited to the specific structure shown and described but wish to include all equivalent variations thereof except as limited by the scope of the claims.

I claim:

1. An electrostatic painting apparatus comprising, a pair of rotary disc atomizers, means for rotatably supporting said discs on substantially vertical axes in spaced apart relationship to each other at substantially the same vertical level so that paint projected from each disc will be projected toward the other, means for rotating said discs at a high speed, means for delivering paint to a surface of each of said discs, and means for charging said discs at a high potential, said supporting means being formed to support said discs for rotation on axes inclined outwardly at a small angle relative to each other so that paint projected from the periphery of each disc will be projected below the edge of the other disc.

2. An apparatus according to claim 1 in which the angle of inclination of said axes is from 2 to 4°.

References Cited in the file of this patent

UNITED STATES PATENTS

| | | |
|---|---|---|
| 2,883,302 | Ransburg | Apr. 21, 1959 |
| 2,894,485 | Sedlacsik | July 14, 1959 |

FOREIGN PATENTS

| | | |
|---|---|---|
| 1,050,071 | France | Aug. 26, 1953 |